(12) United States Patent
Amamoto et al.

(10) Patent No.: US 9,574,073 B2
(45) Date of Patent: Feb. 21, 2017

(54) VULCANIZED RUBBER, METHOD OF MANUFACTURING SAME AND TIRE

(71) Applicant: BRIDGESTONE CORPORATION, Chuo-ku, Tokyo (JP)

(72) Inventors: Tetsuo Amamoto, Kadaira (JP); Koji Masaki, Higashimurayama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 226 days.

(21) Appl. No.: 14/361,324

(22) PCT Filed: Dec. 26, 2012

(86) PCT No.: PCT/JP2012/008344
§ 371 (c)(1),
(2) Date: May 29, 2014

(87) PCT Pub. No.: WO2013/099252
PCT Pub. Date: Jul. 4, 2013

(65) Prior Publication Data
US 2014/0316023 A1    Oct. 23, 2014

(30) Foreign Application Priority Data
Dec. 26, 2011 (JP) ................................. 2011-284118

(51) Int. Cl.
*C08J 3/24* (2006.01)
*C08L 7/00* (2006.01)
*B60C 1/00* (2006.01)
*C08J 9/10* (2006.01)

(52) U.S. Cl.
CPC . *C08L 7/00* (2013.01); *B60C 1/00* (2013.01); *B60C 1/0016* (2013.04); *C08J 3/24* (2013.01); *C08J 9/10* (2013.01); *C08J 2203/04* (2013.01); *C08J 2321/00* (2013.01); *C08K 2201/003* (2013.01); *C08K 2201/005* (2013.01); *C08L 2205/16* (2013.01)

(58) Field of Classification Search
CPC ............. B60C 1/00; B60C 1/0016; C08J 3/24; C08J 9/10; C08J 2203/04; C08J 2321/00; C08L 7/00; C08L 2205/16; C08K 2201/003; C08K 2201/005
See application file for complete search history.

(56) References Cited

U.S. PATENT DOCUMENTS 4,490,497 A * 12/1984 Evrard .................. A61K 6/083
156/327

FOREIGN PATENT DOCUMENTS

| EP | 0940435 A1 | 9/1999 |
|---|---|---|
| EP | 2698397 A1 | 2/2014 |
| JP | 62-283001 A | 12/1987 |
| JP | 09-216970 A | 8/1997 |
| JP | 2003-105116 A | 4/2003 |
| JP | 2008-260889 A | 10/2008 |
| JP | 2009-091388 A | 4/2009 |
| JP | 2009-144032 A | 7/2009 |
| JP | 2011-012111 A | 1/2011 |
| JP | 2012-219245 A | 11/2012 |

OTHER PUBLICATIONS

Cospheric PMMA Microspheres. Copyright 2008.*
Communicaiton dated Jun. 23, 2015, issued by the European Patent Office in counterpart Application No. 12863212.2.
Database WPI Week 200880 Thomson Scientific, London, GB; AN2008-N74970, XP002740391.
Database WPI Week 199743, Thomson Scientific, London, GB; AN1997-466266, XP002740392.
First Office Action issued Feb. 25, 2015 in corresponding Chinese Patent Application No. 201280064853.0 with translation.
Communication dated Aug. 5, 2015 from the State Intellectual Property Office of P.R. China issued in corresponding application No. 201280064853.0.
International Search Report of PCT/JP2012/008344 dated Apr. 2, 2013.
Communication dated Oct. 19, 2015, issued by the Federal Service for Intellectual Property in corresponding Russian Application No. 2014131087.

* cited by examiner

*Primary Examiner* — Irina S Zemel
(74) *Attorney, Agent, or Firm* — Sughrue Mion, PLLC

(57) ABSTRACT

The present invention provides a vulcanized rubber capable of improving ice performance of the tire, in particular a vulcanized rubber which is made by vulcanizing a rubber component and has cells with an aspect ratio of 1-30 of which at least a part of a wall surface is hydrophilic.

14 Claims, 1 Drawing Sheet

VULCANIZED RUBBER, METHOD OF MANUFACTURING SAME AND TIRE

CROSS REFERENCE TO RELATED APPLICATIONS

This is a National Stage of International Application No. PCT/JP2012/008344 filed Dec. 26, 2012, claiming priority based on Japanese Patent Application No. 2011-284118 filed Dec. 26, 2011, the contents of all of which are incorporated herein by reference in their entirety.

TECHNICAL FIELD

The present invention relates to a vulcanized rubber, a method of manufacturing same, and a tire having a tread portion provided with such vulcanized rubber. In particular, the present invention relates to a vulcanized rubber capable of improving ice performance of the tire.

RELATED ART

Conventionally, a tire for use primarily in winter such as a studless tire has a tread portion provided with a foamed rubber with closed cells so as to improves the drainage performance of the tread portion and to improve the ice performance of the tire.

For example, Japanese Patent Application Laid-open No. S62-283001 discloses a pneumatic tire in which a rubber composition of a tread portion consists of polymer having a glass transition temperature not more than 60 degree C., and at least 10% of the entire volume of the tread portion consists of a foamed rubber, and the foamed rubber having closed cells with the mean diameter of 1-120 micrometer, and the expansion ratio of the foamed rubber ranges 1-100%. According to the disclosed technique, the ice and snow performances, wear resistance, exothermic durability of the tire can be simultaneously improved.

SUMMARY OF INVENTION

However, in the conventional studless tire which has a tread portion provided with a rubber with closed cells, the surfaces of the cells are formed of a vulcanized rubber, which is hydrophobic, so that the capability of the cells to absorb water is low. Further, since the ability of the cells to absorb water is low, the cell does not exert sufficient drainage effect. It is, therefore, demanded to further improve the ice performance of the tire.

An object of the present invention is to provide a vulcanized rubber capable of solving the above-mentioned problems of the conventional technique and improving the ice performance of the tire. Another object of the present invention is to provide a method of manufacturing such vulcanized rubber, and a tire having a tread portion provided with such vulcanized rubber and expressing superior ice performance.

As a result of intensive studies to achieve the above object, the present inventors has founded that when the tread portion is provided with a vulcanized rubber having cells with a specific aspect ratio of which at least a part of the wall surface is hydrophilic, the tread portion actively absorbs water to improve the water drainage performance and the wall surfaces of the cell scratch the surface of ice; as a result the ice performance during the use of the ABS can be greatly improved. Based on the finding, the present invention has been accomplished.

That is, the vulcanized rubber made by vulcanizing a rubber composition according to the present invention is characterized in that it has cells with an aspect ratio of 1 to 30, and at least a part of a wall surface of the cell is hydrophilic.

A method of manufacturing vulcanized rubber according to the present invention is characterized by comprising the steps of:

preparing rubber composition by blending a rubber component (D) with a hydrophilic powdery resin (A) with an aspect ratio of 30 or less and a foaming agent (C); and vulcanizing the rubber composition to produce cells of which at least a part of a wall surface is hydrophilic.

Further, the tire according to the present invention is characterized by comprising a tread portion provided with the above-mentioned vulcanized rubber.

According to the present invention, it is possible to provide a vulcanized rubber which has cells with a specific aspect ratio and at least a part of the wall surface of the cell is hydrophilic, resulting an improvement of the ice performance of the tire. Further, it is possible to provide a method of manufacturing such vulcanized rubber, and a tire comprising a tread portion provided with such vulcanized rubber to express superior ice performance.

DESCRIPTION OF EMBODIMENTS

Figure 1:
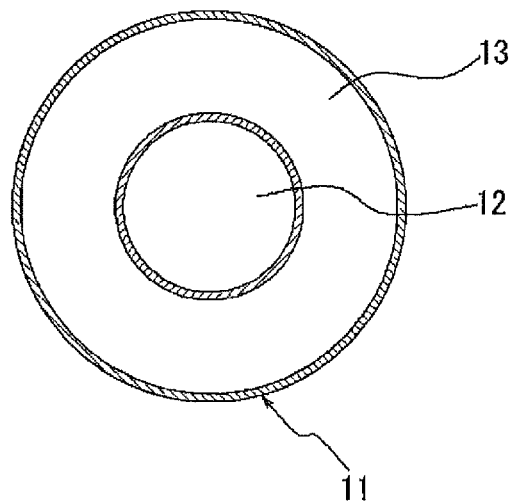
FIG. 1 is a vertical cross-sectional view of one example of a die.

Hereinafter, the present invention will be discussed in detail. A vulcanized rubber made by vulcanizing a rubber composition according to the present invention is characterized in that the vulcanized rubber has cells with an aspect ratio of 1 to 30, and at least a part of a wall surface of the cell is hydrophilic. The vulcanized rubber according to the present invention has the cells with a specific aspect ratio and at least a part of the wall of the cell is hydrophilic, so that, when the vulcanized rubber is disposed in the tread portion of the tire, the wall surfaces of the cells are exposed to the tread surface during the use of the tire to enhance the affinity with water. Therefore, when the vulcanized rubber according to the present invention is disposed in the tread portion of the tire, the cells in the vulcanized rubber can actively absorb water, which renders excellent drainage performance to the tire and eventually can improve the ice performance of the tire significantly. It is noted that if the aspect ratio of the cell exceeds 30, the cells lose the effect of scratching the surface of the tire and, thus, decrease the braking capability during the operation of the ABS. It is also noted that the aspect ratio of a cell is derived from the length of the cell divided by the diameter of the cell.

The rubber composition used for the vulcanized rubber of the present invention preferably contains a hydrophilic powdery resin (A) having the aspect ratio of 30 or less, a foaming agent (C), and a rubber component (D). The aspect ratio of the hydrophilic powdery resin (A) is derived from the length of the hydrophilic powdery resin (A) divided by the diameter of the hydrophilic powdery resin (A). When the rubber composition used for the vulcanized rubber contains the hydrophilic powdery resin (A) and the foaming agent (C), it is possible to disperse the gas produced by the foaming agent (C) within the rubber, or to allow the gas to enter into the melted hydrophilic powdery resin (A) to form cells each having a shape corresponding to the shape of the hydrophilic powdery resin (A). The cells existing in the rubber can serve as a drainage groove after the wear of the tire progresses, which can further render excellent drainage performance to the tire. In particular, the formation of the cells each having a shape corresponding to the shape of the hydrophilic powdery resin (A) can allow the cells to more suitably serve as a drainage groove, which can greatly improve the ice performance of the tire. The above-mentioned foaming agent may be contained in the hydrophilic powdery resin (A). When the aspect ratio of the hydrophilic powdery resin (A) is more than 30, the aspect ratio of the cell is 10 or more. Thus, the cell loses the effect of scratching the surface of ice, so that the braking capability of the ABS is reduced.

The hydrophilic powdery resin (A) preferably has a granular shape, and preferably has the grain diameter of 1 micrometer to 1 millimeter. In the case where the hydrophilic powdery resin (A) has a granular shape, the wall surface of the cell has a better effect of scratching the surface of ice to enhance the ice performance. Further, in the case where the grain diameter is more than 1 millimeter, the granular resin may become a nuclear of destruction of the rubber to reduce the rubber strength and adversely affect the wear of the rubber. In the case where the grain diameter of the hydrophilic powdery resin (A) is less than 1 micrometer, sufficient drainage performance cannot be achieved, which reduces the ice performance.

Furthermore, the rubber composition used for the vulcanized rubber of the present invention preferably contains a hydrophilic elongated resin (B) with the aspect ratio of 50 or more. With both of hydrophilic elongated resin and hydrophilic powdery resin, the ice performance during the ABS is not operated can be improved relative to the case where the hydrophilic elongated resin alone is compounded. The aspect ratio of the hydrophilic elongated resin (B) is derived from the length of the hydrophilic elongated resin (B) divided by the diameter of the hydrophilic elongated resin (B). When the rubber composition used for the vulcanized rubber contains the hydrophilic powdery resin (A), the hydrophilic elongated resin (B) and the foaming agent (C), the gas produced by the foaming agent (C) may be allowed to enter into the melted hydrophilic powdery resin (A) and the melted hydrophilic elongated resin (B) during the vulcanization process to form cells each having a shape corresponding to the shapes of the hydrophilic powdery resin (A) and the hydrophilic elongated resin (B). The cells existing in the rubber can serve as a drainage groove after the wear of the tire progresses, which can further render excellent drainage performance to the tire. In particular, the formation of the cells each having a shape corresponding to the shapes of the hydrophilic powdery resin (A) and the hydrophilic elongated resin (B) can allow the cells to more suitably serve as a drainage groove, which can greatly improve the ice performance of the tire. In addition, the cells derived from the hydrophilic powdery resin (A) and the cells derived from the hydrophilic elongated resin (B) communicate with each other to further improve the drainage effect, which can significantly improve the ice performance of the tire. Thus, the hydrophilic elongated resin (B), in particular, the hydrophilic powdery resin (A) and the hydrophilic elongated resin (B) have a cavity inside created by the foaming of the foaming agent (C). In the case where the aspect ratio of the hydrophilic elongated resin (B) is 4,000 or more, the resin is bent while the rubber is compounded, which may not take full advantage of the use of an elongated material.

The hydrophilic elongated resin (B) preferably has a mean length of 0.1-500 mm and a mean diameter of 0.001-5 mm, and more preferably a mean diameter of 0.005-0.5 mm. If the mean length and the mean diameter are within the above-mentioned range, the fibers are unlikely to be entangled with each other more than necessary and thus the likelihood of inhibiting the good dispersibility can be eliminated.

Further, the hydrophilic powdery resin (A) and the hydrophilic elongated resin (B) are preferably coated with a resin having affinity for the rubber component. When the hydrophilic powdery resin (A) and the hydrophilic elongated resin (B) are coated with a resin having an affinity for the rubber component, the dispersion of the hydrophilic elongated resin in the rubber, which is hydrophobic, can be facilitated to improve the resistance of the rubber against the fracture strength and eventually improve the abrasion resistance of the rubber.

The rubber component (D) is not particularly limited, and natural rubber (NR) as well as synthetic rubber such as polyisoprene rubber (IR), styrene-butadiene copolymer rubber (SBR), polybutadiene rubber (BR), ethylene-propylene-diene rubber (EPDM), chloroprene rubber (CR), halogenated butyl rubber, acrylonitrile-butadiene rubber (NBR) may be used. Among these, natural rubber (NR), styrene-butadiene copolymer rubber (SBR) and polybutadiene rubber (BR) are preferred. The rubber components may be used alone or in combination of two or more thereof.

The hydrophilic resin used for the hydrophilic powdery resin (A) and the hydrophilic elongated resin (B) is not particularly limited so long as the resin is capable of exhibiting an affinity for water, i.e. the resin has a hydrophilic group in the molecule. Preferably, the resin contains an oxygen atom, a sulfur atom or a nitrogen atom. and more preferably contains at least one functional group selected from the group consisting of —OH, —COOH, —OCOR (R is an alkyl group), —NH$_2$, —NCO, and —SH, and still more preferably contains at least one functional group selected from the group consisting of —OH, —COOH, —NH$_2$, and —NCO.

As the hydrophilic resins used for the hydrophilic powdery resin (A) and the hydrophilic elongated resin (B), ethylene-vinyl alcohol copolymer, vinyl alcohol homopolymer, poly (meth) acrylic acid or ester thereof, polyethylene glycol, carboxy vinyl copolymer, styrene-maleic acid copolymer, polyvinyl pyrrolidone, vinyl pyrrolidone-vinyl acetate copolymer, mercaptoethanol and the like are preferable. Among these, ethylene-vinyl alcohol copolymer, vinyl alcohol homopolymer, and poly (meth) acrylic acid are more preferred, and ethylene-vinyl alcohol copolymer is particularly preferable.

The hydrophilic resin used for the hydrophilic powdery resin (A) and the hydrophilic elongated resin (B) is preferably insoluble in water. In this case, the hydrophilic powdery resin (A) and the hydrophilic elongated resin (B) do not dissolve into the water on the road surface upon exposing to the tread surface, so that hydrophilic property of the tread surface can be maintained over a long period and thus the drainage performance and the ice performance of the tread can be improved over a long period.

Further, the hydrophilic resin used for the hydrophilic powdery resin (A) and the hydrophilic elongated resin (B) preferably has a melting point smaller than the maximum temperature of vulcanization. In this case, the hydrophilic powdery resin (A) and the hydrophilic elongated resin (B) are melted during the vulcanization and incorporate the gas generated from the foaming agent (C) to be able to form cells having a desired shape. Each of the formed cells has a shape corresponding to the shape of the hydrophilic powdery resin (A) and the hydrophilic elongated resin (B). It is noted that the maximum temperature of vulcanization refers to the highest temperature that the rubber composition reaches during the vulcanization of the rubber component. For example, in the case of mold vulcanization, the maximum vulcanization temperature is the highest temperature that the rubber composition reaches from the time the rubber composition is put in the mold to the time the rubber composition is removed from the mold and is cooled. The maximum vulcanization temperature can be measured, for example, with a thermocouple embedded in the rubber composition. The upper limit of the melting point of the hydrophilic powdery resin (A) and the hydrophilic elongated resin (B) is not particularly limited, but preferably selected in consideration of the above points, and, in general, is preferably 10 or more degree C., and more preferably 20 or more degree C. lower than the maximum vulcanization temperature of the rubber composition. The industrially practical vulcanization temperature of the rubber composition is generally about 190 degrees C. For example, if the maximum vulcanization temperature is set to 190 degree C., the melting point of the above-mentioned low-melting point resin is selected in a temperature range of generally 190 degree C. or less, preferably 180 degree C. or less, and more preferably 170 degree C. or less.

The amount of compounded hydrophilic powdery resin (A) is preferably 0.1-100 parts by mass with the rubber component (D) as 100 parts by mass. With adjusting the amount of compounded hydrophilic powdery resin (A) within the above-mentioned range with the rubber component (D) as 100 parts by mass, it is possible to balance the ice performance and the wear resistance.

The amount of compounded hydrophilic elongated resin (B) is preferably 0.1-100 parts by mass with the rubber component (D) as 100 parts by mass. With adjusting the amount of compounded hydrophilic elongated resin (B) within the above-mentioned range with the rubber component (D) as 100 parts by mass, it is possible to balance ice performance and the wear resistance.

As the foaming agent (C), azodicarbonamide (ADCA), dinitrosopentamethylenetetramine (DPT), dinitrosopentamethylene styrene tetramine, benzenesulfonyl hydrazide derivatives, p, p'-oxybis benzene sulfonyl hydrazide (OBSH), carbon dioxide generating agents such as ammonium bicarbonate, sodium bicarbonate and ammonium carbonate, nitrogen-generating agents such as nitroso sulfonyl azo compound, and N,N'-dimethyl-N,N'-dinitroso phthalamide, toluenesulfonyl hydrazide, p-toluenesulfonyl semicarbazide, p,p'-is oxybisbenzenesulfonyl semicarbazide may be cited by way of example. From the viewpoint of the processability, azodicarbonamide (ADCA), dinitrosopentamethylenetetramine (DPT) are preferable, and azodicarbonamide (ADCA) is more preferable. The foaming agents may be used alone or in combination of two or more thereof. The amount of compounded foaming agent (C) is preferably 0.1-50 parts by mass, and more preferably 0.1-10 parts by mass with the rubber component (D) as 100 parts by mass.

Further, the foaming agent (C) is preferably used in combination with a foaming aid such as urea, zinc stearate, benzenesulfinic acid zinc and zinc. The foaming aids may be used alone or in combination of two or more thereof. The concurrent use of the foaming aid can promote the foaming reaction to enhance the completeness of the reaction and inhibit the undesirable degradation over time.

When the hydrophilic elongated resin (B) is coated with a resin having an affinity for the rubber component, for example, a resin having solubility parameter (SP value) similar to that of the rubber component (D), in particular, polyolefin resin may be preferably used as the resin having an affinity for the rubber component. The polyolefin resin may be either branched or linear, or may also be an ionomer resin in which molecules in ethylene-methacrylic acid copolymer are cross-linked with metal ions. Examples of the polyolefin resin include polyethylene, polypropylene, polybutene, polystyrene, ethylene-propylene copolymer, ethylene-methacrylic acid copolymer, ethylene-ethyl acrylate copolymers, ethylene-propylene-diene ternary copolymer, ethylene-vinyl acetate copolymer, and ionomer resins thereof. These resins may be used alone or in combination of two or more thereof. Among these, polyethylene resins, polypropylene resins, polyolefin ionomers, maleic anhydride-modified α-polyolefins are particularly preferred. Polyolefin ionomers or maleic anhydride-modified α-polyolefins bond to the hydroxyl groups as well, so that it is possible to further improve the rubber strength.

Figure 2:
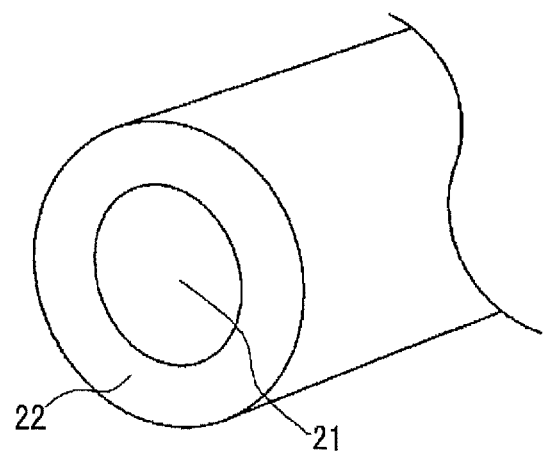
FIG. 2 is a perspective view of a vertical cross-section of one example of hydrophilic elongated resin (B) coated with a resin (E) having an affinity for rubber component.

The hydrophilic elongated resin (B) coated with a resin having an affinity for the rubber component may be produced, for example, by simultaneously extruding the hydrophilic resin from the die outlet 12 and the resin having an affinity for the rubber component from the die outlet 13 by means of an extruder provided with a die 11 as shown in FIG. 1 to form an undrawn yarn, and then hot-drawing the undrawn yarn to give an elongated (fibrous) shape. In this way, a composite fiber in which, as shown in FIG. 2, the hydrophilic elongate resin (B) 21 is positioned approximately at the center of the fiber and is coated with the resin having an affinity for the rubber component is obtained.

The amount of each resin may vary depending on the length and the diameter of the hydrophilic elongated resin (B) thus obtained, but usually 0.1-80 parts by mass, and preferably 0.1-20 parts by mass of the resin having an affinity for the rubber component is generally used with the hydrophilic resin as 100 parts by mass. By using the resins within the above-mentioned ranges, a coating layer 22 composed of the resin having an affinity for the rubber component capable of exhibiting the desired effect can be effectively formed on the surface of the hydrophilic elongated resin (B) 21 obtained after the drawing process.

The vulcanized rubber according to the present invention may be produced by (i) blending rubber component (D) with the hydrophilic powdery resin (A) having the aspect ratio of 10 or less and the foaming agent (C) to prepare a rubber composition, and (ii) vulcanizing the rubber composition to produce cells of which at least a part of the wall surface is hydrophilic. Further, in the case of using the hydrophilic elongated resin (B), the rubber component (D) is blended with the hydrophilic powdery resin (A) having the aspect ratio of 30 or less, the hydrophilic elongated resin (B) having the aspect ratio of 50 or more and the foaming agent (C) to prepare a rubber component, and then the rubber component is vulcanized to produce the vulcanized rubber.

In addition to the rubber component (D), the hydrophilic powdery resin (A), the hydrophilic elongated resin (B) and the foaming agent, a compounding agent which is commonly used in the rubber industry such as a filler, for example, carbon black, a softening agent, stearic acid, an antiaging agent, zinc white, a vulcanization accelerator, a vulcanizing agent may be appropriately compounded in the rubber composition within a range that does not impair the object of the present invention.

The tire according to the present invention is characterized in that the above-mentioned vulcanized rubber is provided on a tread portion and excellent ice performance can be exerted. Moreover, depending on the type and member of the tire to be applied, the tire according to the present invention may be vulcanized after the molding of an unvulcanized rubber composition, or may be fully vulcanized after the molding of semi-vulcanized rubber having been processed in a pre-vulcanization process. It is noted that the gas to be filled in the tire may be an inert gas such as nitrogen, argon or helium as well as the ordinal air or air having been adjusted its partial oxygen pressure.

EXAMPLES

Hereinafter, the present invention is described in more detail with reference to examples, but the present invention is not limited to the following examples.

Production Example 1

Preparation of Hydrophilic Powdery Resin (A) and Hydrophilic Elongated Resin (B)

A twin-screw extruder provided with a die 11 and two hoppers as shown in FIG. 1 was used, and ethylene-vinyl alcohol copolymer (EVAL F104B available from Kuraray Co., Ltd.) was charged into both of the hoppers and was extruded from the die outlets 12 and 13. The obtained fiber was cut into the lengths of 0.2 mm, 0.4 mm, 0.6 mm, 1 mm, 2 mm and 4 mm in accordance with the conventional manner. In this way, the hydrophilic powdery resin (A) and the hydrophilic elongated resin (B) consisting of ethylene-vinyl alcohol copolymer (EVOH) were prepared. The mean diameter was 0.02 mm.

According to this procedure, the following resins were prepared:
(1) Powdery resin having the length of 0.2 mm and the diameter of 0.02 mm (aspect ratio=10),
(2) Powdery resin having the length of 0.4 mm and the diameter of 0.02 mm (aspect ratio=20),
(3) Powdery resin having the length of 0.6 mm and the diameter of 0.02 mm (aspect ratio=30),
(4) Elongated resin having the length of 1 mm and the diameter of 0.02 mm (aspect ratio=50),
(5) Elongated resin having the length of 2 mm and the diameter of 0.02 mm (aspect ratio=100), and
(6) Elongated resin having the length of 4 mm and the diameter of 0.02 mm (aspect ratio=200).

Production Example 2

Preparation of the Hydrophobic Powdery Resin

According to the above-mentioned method, powdery resins consisting solely of polyethylene (Novatec U360 available from Japan Polyethylene Corporation) were prepared as comparative examples of a hydrophobic foam cell by the following standards:
(7) Powdery resin having the length of 0.2 mm and the diameter of 0.02 mm (aspect ratio=10),
(8) Powdery resin having the length of 0.4 mm and the diameter of 0.02 mm (aspect ratio=20), and
(9) Powdery resin having the length of 0.6 mm and the diameter of 0.02 mm (aspect ratio=30).

Preparation Example 3

Preparation of Hydrophilic Powdery Resin (A) and Hydrophilic Elongated Resin (B)

A twin-screw extruder provided with a die 11 and two hoppers as shown in FIG. 1 was used, and ethylene-vinyl alcohol copolymer (EVAL F104B available from Kuraray Co., Ltd.) and polyethylene (Novatec U360 available from Japan Polyethylene Corporation) were respectively charged into different hoppers, and were concurrently extruded from the die outlets 12 and 13, respectively. The obtained fiber was cut into the lengths of 0.2 mm and 2 mm in accordance with the conventional manner. In this way, the hydrophilic powdery resin (A) and the hydrophilic elongated resin (B) consisting of hydrophilic resin portion of ethylene-vinyl alcohol copolymer (EVOH) coated with polyethylene (PE) were prepared. The mass ratio between ethylene-vinyl alcohol copolymer (EVOH) and polyethylene (PE) is EVOH:PE=70:30 and the mass diameter is 0.02 mm.

According to this procedure, the following resins were prepared:
(10) Powdery resin having the length of 0.2 mm and the diameter of 0.02 mm (aspect ratio=10), and
(11) Elongated resin having the length of 2 mm the diameter of 0.02 mm (aspect ratio=100).

<Preparation of the Rubber Composition>

The hydrophilic powdery resin (A) and the hydrophilic elongated resin (B) were used to prepare rubber compositions in the formulation shown in Table 1.

TABLE 1

|  | Compounded amount (Parts by mass) |
| --- | --- |
| Natural rubber | 60 |
| Polybutadiene rubber *1 | 40 |
| Carbon black *2 | 60 |
| Stearic acid | 2 |
| Zinc flower | 6 |
| Vulcanization accelerator *3 | 12 |
| Insoluble sulfur | 4 |
| Foaming agent *4 | 4 |
| Hydrophilic powdery resin (A) | Variable *5 |
| Hydrophilic elongated resin (B) | Variable *6 |

*1 cis-1,4-polybutadiene, brand name "BR01" available from JSR Ltd.
*2 brand name "carbon N220" available from Asahi Carbon Ltd.
*3 di-2-benzothiazyldisulfide, brand name "NOCCELER DM" available from Ouchi Shinko Chemical Industrial Co., Ltd.
*4 dinitrosopentamethylenetetramine (DPT), brand name "Cellmic AN" available from Sankyo Kasei Co., Ltd.,
*5, *6 the amounts are shown in Tables 2 and 3

<Production of Tire>

Rubber compositions prepared in the formulation as shown in Table 1 were disposed on the tread portion to build a green tire, and the green tire was vulcanized in accordance with the conventional manner to give a tire having the size of 195/65R15. The tread portion of the tire thus obtained was observed with a microscope VHX500 available from Keyence Corporation, and cells each having a shape corresponding to the shapes of the hydrophilic powdery resin (A) and the hydrophilic elongated resin (B) were confirmed to be formed. The ice performance and the wear resistance of the tires thus obtained were evaluated by the following method. The results are shown in Tables 2 and 3.

(1) Ice Performance (without ABS)

A tire having a tread portion with the ware rate of 20% was fitted onto a vehicle of which the ABS was deactivated. The vehicle was driven on an ice flat road, the brake was applied at the speed of 20 km/h to lock the tires, and the braking distance until the complete stop was measured. The results are indicated in an index with the reciprocal of the braking distance of Comparative Example 1 as 100. The larger the index value is, the better the braking performance on ice is. It is noted that the wear rate of the tread portion is calculated by the following formula:

wear rate (%)=(1−groove depth after wear/groove depth before use)×100

(2) Ice Performance (with ABS)

A tire having a tread portion with the ware rate of 20% was fitted onto a vehicle of which the ABS was activated. The vehicle was driven on an ice flat road, the brake was applied at the speed of 20 km/h to lock the tires, and the braking distance until the complete stop was measured. The results are indicated in an index with the reciprocal of the braking distance of Comparative Example 1 as 100. to indicate that the larger the index value is, the better the braking performance on ice. It is noted that the wear rate of the tread portion is calculated by the following formula:

wear rate (%)=(1−groove depth after wear/groove depth before use)×100

(3) Wear Resistance

An actual vehicle equipped with tires having the seize of 195/65R15 was driven on a paved road over 10,000 km. Then the depth of the remaining groove was measured to calculate the driving distance necessary for the wear of 1 mm. The results are indicated in an index with the result of Comparative Example 1 as 100.

TABLE 2

| | | | Comp. Ex. 1 | Comp. Ex. 2 | Comp. Ex. 3 | Comp. Ex. 4 |
|---|---|---|---|---|---|---|
| Amount of compounded hydrophobic powdery resin | Powdery resin consisting of polyethylene with aspect ratio = 10 | Parts by mass | — | 3 | — | — |
| | Powdery resin consisting of polyethylene with aspect ratio = 20 | | — | — | 3 | — |
| | Powdery resin consisting of polyethylene with aspect ratio = 30 | | — | — | — | 3 |
| Evaluation results | Aspect ratio of cells in tread portion of tire | | — | 1 (granular) | 10 | 20 | 30 |
| | Ice performance (w/ABS) | Index | 100 | 97 | 96 | 90 |
| | Ice performance (w/o ABS) | Index | 100 | 101 | 103 | 103 |
| | Wear resistance | Index | 100 | 101 | 102 | 101 |

From the results shown in Tables 2 and 3, it is found that the tread portion provided with the vulcanized rubber having cells with the aspect ratio of 1-30 of which at least a part of the wall surface is hydrophilic can improve the ice performance of the tire.

Further, Examples 4 to 6 show that the ice performance of the tire can be greatly improved by using the hydrophilic powdery resin (A) and the hydrophilic elongated resin (B) to form both of cells with the aspect ratio of 30 or less and cells with the aspect ratio of 50 or more.

Moreover, Example 7 shows that the hydrophilic powdery resin (A) and the hydrophilic elongated resin (B) in which ethylene-vinyl alcohol copolymer (EVOH) is coated with polyethylene (PE) can greatly improve the wear resistance of the tire.

REFERENCE SIGNS LIST

11: Die
12, 13: Die outlet
21: Hydrophilic elongated resin (B)
22: Coating layer consisting of a resin having affinity for the rubber component

The invention claimed is:

1. A vulcanized rubber made by vulcanizing a rubber composition containing a hydrophilic powdery resin (A) with an aspect ratio of 30 or less, a hydrophilic elongated resin (B) with the aspect ratio of 50 or more, a foaming agent (C) and a rubber component (D), wherein the hydrophilic elongated resin (B) is coated with a resin having affinity for the rubber component, which comprises cells with an aspect ratio of 1-30, wherein at least a part of a wall surface of the cell is hydrophilic.

2. The vulcanized rubber according to claim 1, wherein the hydrophilic powdery resin (A) has a granular shape.

3. The vulcanized rubber according to claim 1, wherein the hydrophilic powdery resin (A) has a grain diameter of 1 micrometer to 1 millimeter.

4. The vulcanized rubber according to claim 1, wherein the hydrophilic elongated resin (B) has a mean length of 0.1-500 mm and a mean diameter of 0.005-0.5 mm.

TABLE 3

| | | | Comp. Ex. 5 | Comp. Ex. 6 | Comp. Ex. 7 | Ex. 1 | Ex. 2 | Ex. 3 | Ex. 4 | Ex. 5 | Ex. 6 | Ex. 7 |
|---|---|---|---|---|---|---|---|---|---|---|---|---|
| Amount of compounded hydrophilic powdery resin (A) | Powdery resin of EVOH with aspect ratio = 10 | Parts by mass | — | — | — | 3 | — | — | 1.5 | 1.5 | 1.5 | — |
| | Powdery resin of EVOH with aspect ratio = 20 | | — | — | — | — | 3 | — | — | — | — | — |
| | Powdery resin of EVOH with aspect ratio = 30 | | — | — | — | — | — | 3 | — | — | — | — |
| | Powdery resin of EVOH coated with PE with aspect ratio = 10 | | — | — | — | — | — | — | — | — | — | 1.5 |
| Amount of compounded hydrophilic elongated resin (B) | Elongated resin of EVOH with aspect ratio = 50 | | 3 | — | — | — | — | — | 1.5 | — | — | — |
| | Elongated resin of EVOH with aspect ratio = 100 | | — | 3 | — | — | — | — | — | 1.5 | — | — |
| | Elongated resin of EVOH with aspect ratio = 200 | | — | — | 3 | — | — | — | — | — | 1.5 | — |
| | Elongated resin of EVOH coated with PE with aspect ratio = 100 | | — | — | — | — | — | — | — | — | — | 1.5 |
| Evaluation results | Aspect ratio of cells in tread portion | | — | 50 | 100 | 200 | 10 | 20 | 30 | 10, 50 | 10, 100 | 10, 200 | 10, 100 |
| | Ice performance (w/ABS) | Index | 101 | 98 | 96 | 124 | 116 | 110 | 126 | 116 | 114 | 116 |
| | Ice performance (w/o ABS) | Index | 112 | 117 | 117 | 102 | 105 | 107 | 121 | 128 | 132 | 128 |
| | Wear resistance | Index | 82 | 83 | 83 | 82 | 82 | 80 | 81 | 82 | 81 | 101 |

5. The vulcanized rubber according to claim 1, wherein the hydrophilic elongated resin (B) has a cavity inside created by the foaming of the foaming agent (C).

6. The vulcanized rubber according to claim 1, wherein the hydrophilic resin used for the hydrophilic powdery resin (A) and the hydrophilic elongated resin (B) contain at least one functional group selected from the group consisting of —OH, —COOH, —OCOR (R is an alkyl group), —NH$_2$, —NCO, and —SH.

7. The vulcanized rubber according to claim 6, wherein the hydrophilic resins used for the hydrophilic powdery resin (A) and the hydrophilic elongated resin (B) comprises ethylene-vinyl alcohol copolymer, vinyl alcohol homopolymer or poly (meth) acrylic acid.

8. The vulcanized rubber according to claim 1, wherein the hydrophilic resin used for the hydrophilic powdery resin (A) and the hydrophilic elongated resin (B) has a melting point smaller than the maximum temperature of vulcanization.

9. The vulcanized rubber according to claim 8, wherein the resin having affinity for the rubber component comprises polyolefin resin.

10. The vulcanized rubber according to claim 1, wherein the amount of the compounded hydrophilic powdery resin (A) is 0.1-100 parts by mass with the rubber component (D) as 100 parts by mass.

11. The vulcanized rubber according to claim 1, wherein the amount of the compounded hydrophilic elongated resin (B) is 0.1-100 parts by mass with the rubber component (D) as 100 parts by mass.

12. The vulcanized rubber according to claim 1, wherein the amount of the compounded foaming agent (C) is 0.1-10 parts by mass with the rubber component (D) as 100 parts by mass.

13. A method of manufacturing vulcanized rubber, comprising the steps of:
    preparing rubber composition by blending a rubber component (D) with a hydrophilic powdery resin (A) with an aspect ratio of 30 or less, a hydrophilic elongated resin (B) with an aspect ratio of 50 or more, and a foaming agent (C), wherein the hydrophilic elongated resin (B) is coated with a resin having affinity for the rubber component; and
    vulcanizing the rubber composition to produce cells of which at least a part of a wall surface is hydrophilic.

14. A tire comprising a tread portion provided with the vulcanized rubber according to claim 1.

* * * * *